United States Patent [19]
Cicognani

[11] 3,856,907
[45] Dec. 24, 1974

[54] PROCESS FOR MANUFACTURING TOOTHED BELTS

[75] Inventor: Marion Cicognani, Milan, Italy

[73] Assignee: Industrie Pirelli S.p.A., Milan, Italy

[22] Filed: Oct. 4, 1972

[21] Appl. No.: 294,982

[30] Foreign Application Priority Data
Oct. 6, 1971 Italy.................................. 29542/71

[52] U.S. Cl.................. 264/254, 264/229, 264/255, 264/257, 264/275, 425/117
[51] Int. Cl............................................ B29h 9/02
[58] Field of Search ........... 264/229, 257, 275, 326, 264/254, 255; 156/137, 138, 139, 140, 141; 425/117, 324

[56] References Cited
UNITED STATES PATENTS

| | | | |
|---|---|---|---|
| 3,320,108 | 5/1967 | Lande | 264/257 |
| 3,473,989 | 10/1969 | Richmond | 156/140 |

Primary Examiner—Robert F. White
Assistant Examiner—T. E. Balhoff
Attorney, Agent, or Firm—Clelle W. Upchurch

[57] ABSTRACT

A process and apparatus for manufacturing toothed belts of elastic material in which a plurality of listels spaced apart a uniform distance are applied transversally on a band of rubberized fabric and secured thereto. The band with listels then is formed into a ring on a support after which a winding of cords is applied to the band with listels. Subsequently a layer of elastomeric material is formed on the winding of cords to form a transversally rigid annular sleeve, which is molded and cured after having had the listels removed therefrom. The apparatus includes a plurality of listels connected by a rope attached to small bars fitting within holes in the ends of the listels, a pair of grooved rollers having parallel axes carried on a frame provided with an endless screw having opposing threads on either end thereof to move bearings supporting the shafts of the rollers toward and away from each other, U-shaped plates to secure a rubberized fabric to the listels, a hinged rod carrying a gear meshable with a gear secured to the shaft of one roller to cause rotation of one grooved roller about its own axis, three small rollers having parallel axes supported by a bracket connected to an endless screw to apply a winding of cord about the grooved rollers and two plates one of which has a surface with parallel grooves therein to mold and cure a transversally rigid sleeve produced on the grooved rollers.

2 Claims, 9 Drawing Figures

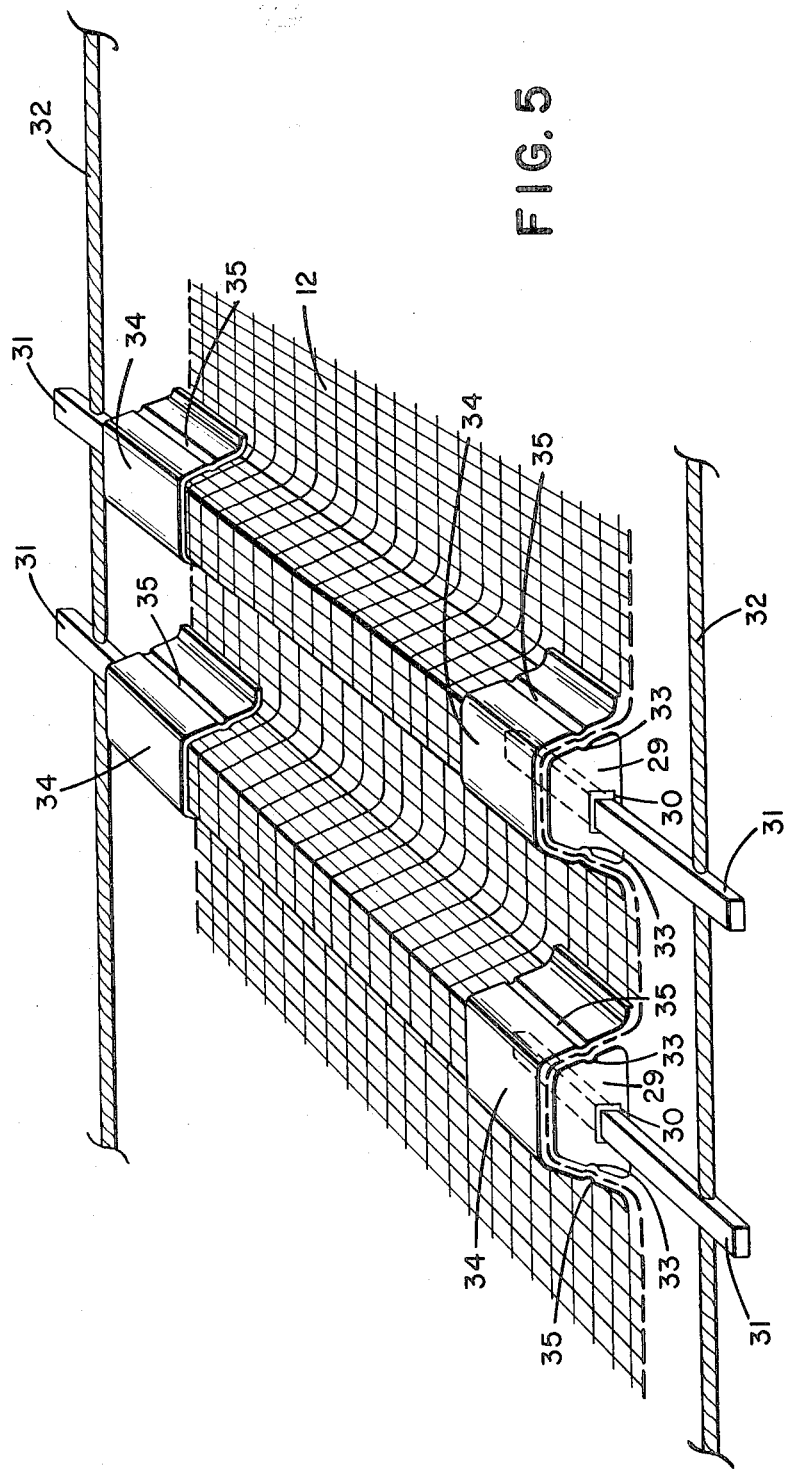

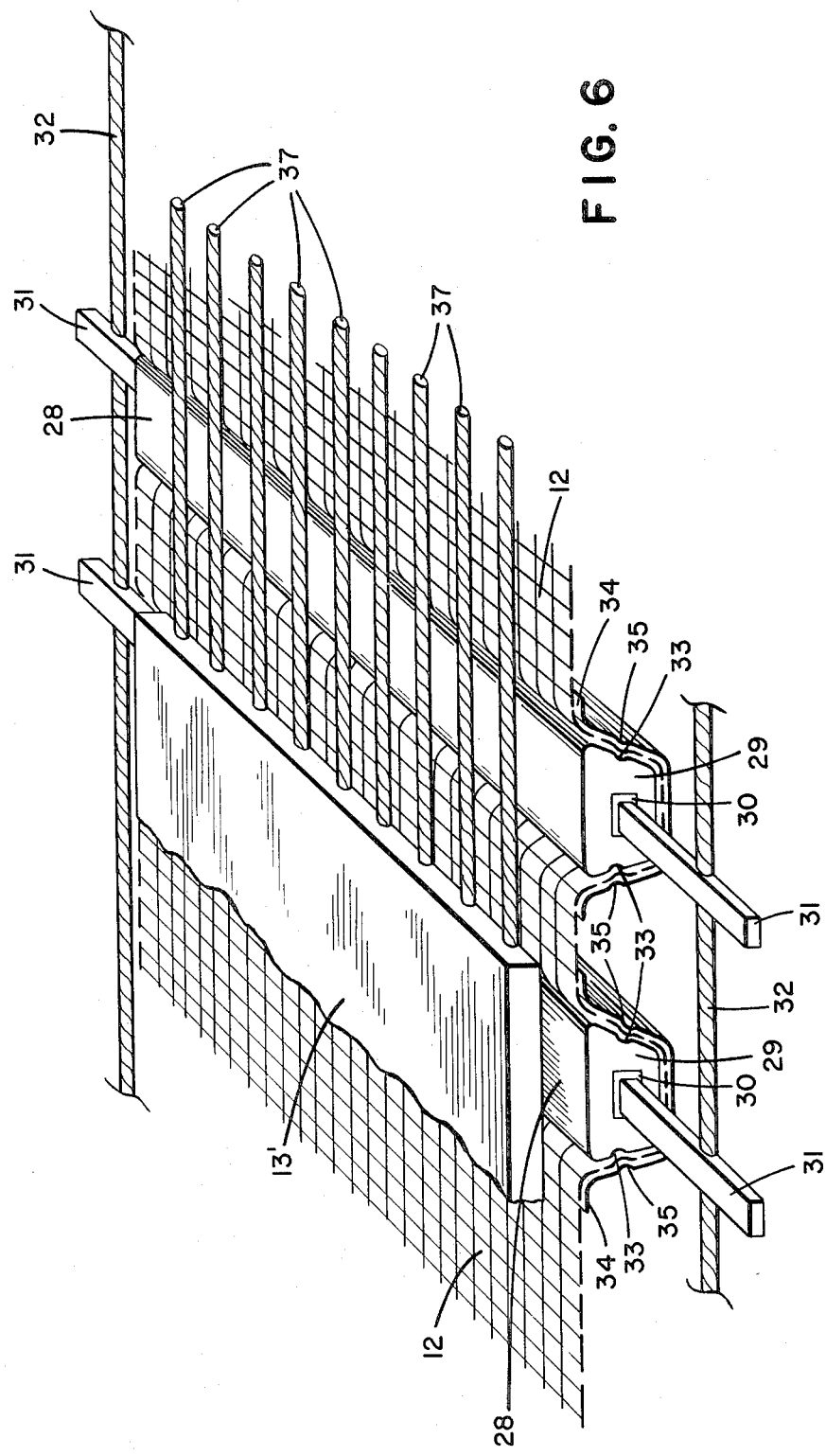

PROCESS FOR MANUFACTURING TOOTHED BELTS

The present invention relates to a process and apparatus for manufacturing toothed belts, in particular toothed belts having a large layout.

It is known to manufacture toothed belts, by placing a layer of fabric intended to cover the teeth and the grooves of the belt, on a grooved cylindrical drum and shaping it according to the form of the revolutionary surface of the drum itself. A winding of cords, which will form the resistant insertion of the belt, is placed on the layer of fabric followed by a layer of elastomeric material on the assembly. The unit constituted by the fabric, the winding of cords and the layer of elastomeric material forms a sleeve.

This operation is followed by assembling an elastic bell on the grooved drum carrying the above indicated layers, and introducing the unit into an autoclave, to which steam under pressure is admitted.

Inside the autoclave the molding and curing of the belts is completed by virtue of the action of the heat and of the steam pressure. A conventional apparatus is used to carry out the above described known process.

This known apparatus comprises a metallic cylindrical drum provided on its outer revolutionary surface with a plurality of grooves and ribs, parallel to the drum axis, which corresponds, respectively, to the shape of the teeth and grooves of the belt toothing.

The above described metallic drum acts simultaneously as a building drum and is a curing drum and as a curing half-mold.

The other curing half-mold is constituted by an elastic bell arranged inside a curing autocalve, into which the drum is introduced.

The apparatus also includes means for transferring the metallic drum carrying the sleeve inside the elastic bell and then into the autoclave.

Both the process and the apparatus as described above are not devoid of disadvantages.

Such disadvantages consist in the practical impossibility of manufacturing toothed belts having a large layout, since, to obtain them, it is necessary to provide metallic drums having a very large diameter, and consequently a considerable weight, so that it is difficult to carry out their actuation and their displacement. The result is a limitation on producing toothed belts, together with high costs for the plant and for the toothed belts production.

The present invention provides a process and an apparatus for the manufacture of toothed belts, which do not reflect the above mentioned drawbacks and consequently permit the production of toothed belts of any layout at low plant and production costs.

The object of the present invention is a process for manufacturing toothed belts of elastomeric material, characterized by comprising the steps of: applying transversally on a band of rubberized fabric a plurality of listels spaced apart at regular intervals from one another; causing said rubberized fabric to adhere to a part of the outer surface of said listels; closing the fabric provided with the listels to form a ring on a support; applying a winding of cords on the ring of fabric, provided with listels, while it is supported; forming a layer of elastomeric material on the winding of cords, to create a transversally rigid annular sleeve; removing the transversally rigid sleeve from the support; removing the listels from a certain portion of the transversally rigid sleeve; molding while curing the sleeve portion from which the listels have been removed, and repeating the last two steps until the whole sleeve is treated.

A further object of the present invention is an apparatus for manufacturing toothed belts of elastomeric material, characterized by comprising a plurality of listels and flexible means for connecting them to one another; a pair of grooved rollers having parallel axes and supported by a frame provided with means for initiating the approach and detachment of the rollers, the grooves of the rollers being such as to receive the plurality of listels; means for rotating one of the grooved rollers about its own axis; means for rotating the whole frame supporting the two rollers about an axis parallel to the axis of the rollers and means for applying a winding of cords about the two rollers; means for tranferring a transversally rigid belt sleeve, manufactured on the two rollers, from the rollers to a molding means, and means for molding subsequent portions of the transversally rigid sleeve.

The present invention will be more clearly understood from the following detailed description, made by way of non-limiting example witih reference to the FIGS. of the attached sheets of drawings, in which:

FIGS. 5 and 6 illustrate two different stages of the belt in its production;

Figure 1:
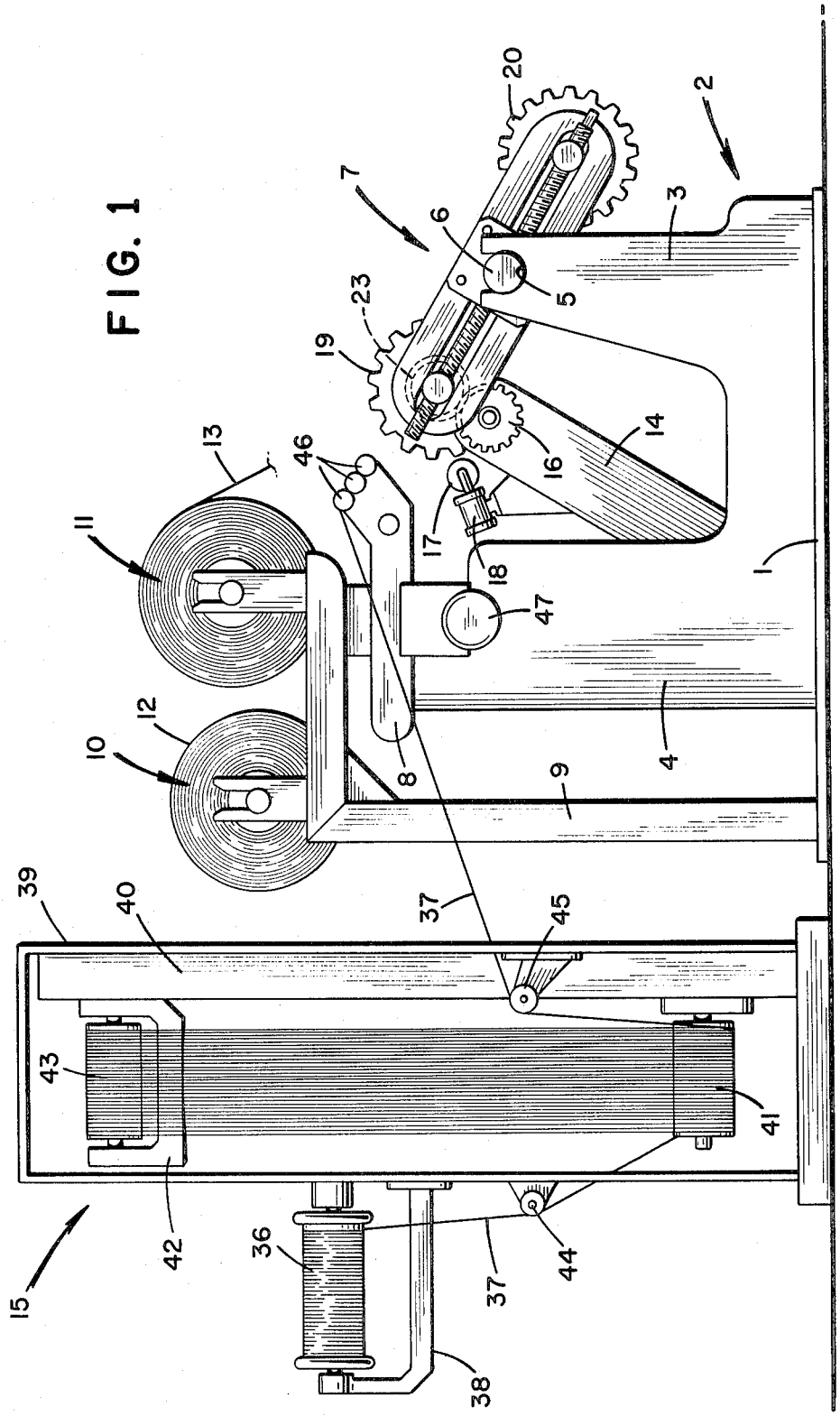
FIG. 1 represents diagrammatically, in side view, the manufacturing apparatus for producing a transversally rigid belt sleeve of the present invention.

The process according to the present invention is carried out by the following steps, which are effected seriation.

Prismatic quadrilateral rigid listels are applied transversally on a fabric in such a way that they are in contact with it along three of their faces. The listels, having a length equal to the fabric width, are applied on the fabric at equal intervals from one another, said intervals corresponding to the pitch of toothing of the belt to be produced.

The fabric carrying the listels is then closed as a ring on a support formed by two grooved rollers, in the grooves of which the listels are encased. The ring of fabric is provided with transversal stiffening elements and is supported by the unit formed by the two rollers. If desired, the fabric provided with the listels can be stitched in order to impart to it a permanent deformation, namely one which conforms permanently to the shape of the listels, i.e., according to the belt toothing.

A winding of cords, made of a material selected among metal wires, glass fibers, or artificial fibers, is applied on the so obtained ring supported in such a way as to impart to it a permanent form both transversally and longitudinally.

The winding of cords has the shape of a layer, which will constitute the resistant insertion of the belt.

The ring of fabric provided with the winding of cords is then joined, after the application of an appropriate adhesive agent, with at least one layer of elastomeric material, whose thickness is such as to confer to said elastomeric material a volume equal to the volume of the elastomeric material of the finished toothed belt. Moreover, the layer of elastomeric material has a width smaller than the width of the fabric which, as stated above, is equal to the length of the listels. The layer of elastomeric material is applied on the fabric in such a manner as to leave bare the edges of the latter, and consequently the ends of the listels. An annular sleeve for belts is thus obtained, which is provided with transversal stiffening elements. This sleeve hereafter is designated as "transversally rigid annular sleeve".

The transversally rigid annular sleeve obtained is transferred between the platens of a plane press, one of which is provided with a plurality of grooves and with a plurality of corresponding ribs, having respectively the shape of the teeth and of the grooves of the toothed belt to be produced.

The insertion of the sleeve between the platens of the plane press is carried out by arranging the listels inside the grooves. Subsequently, the listels which are arranged in the grooves of the platens of said press are removed and the platens are moved toward each other.

The transversally rigid annular sleeve is subsequently molded and the elastomeric material constituting it is cured under the action of the pressure exerted by the platens and the heat generated by the latter.

After having cured the portion of the transversally rigid annular sleeve, the platens are opened, the portion of toothed belt so shaped and cured is removed from said platens, and a subsequent portion of transversally rigid annular sleeve is inserted between said platens.

The insertion of said subsequent portion of transversally rigid annular sleeve between the press platens is effected by arranging the teeth at the end of the already shaped and cured portion of toothed belt within the end grooves of the press platens. The process is then continued as described above.

When the toothed belt is formed, the skirting of fabric projecting from its edge is trimmed.

Figure 7:
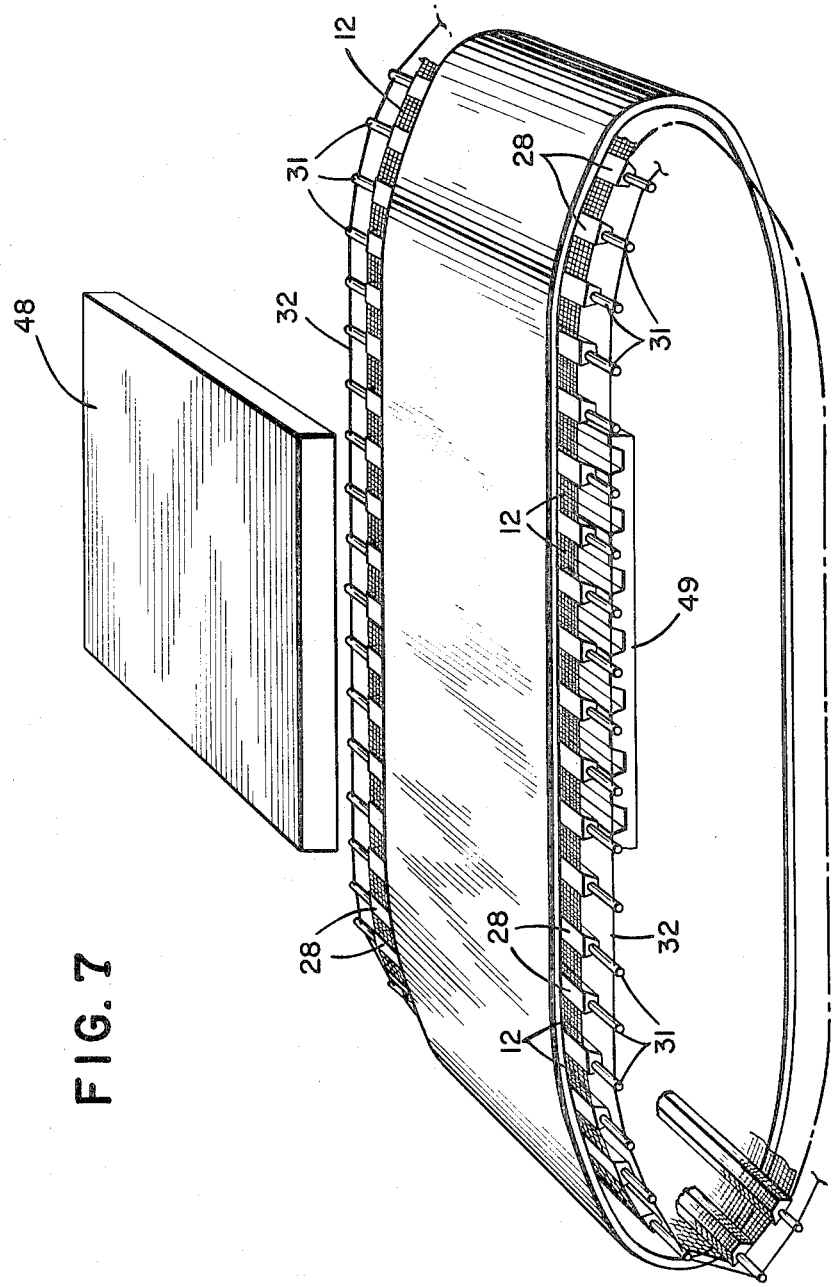
FIG. 7 represents the platens of a press with a transversally rigid belt sleeve according to the present invention.
Figure 8:
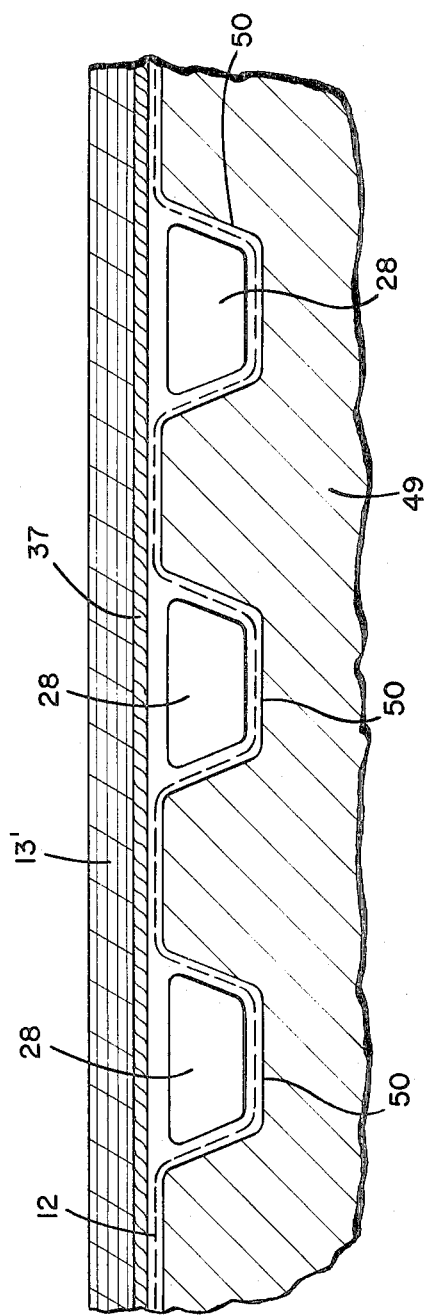
FIG. 8 illustrates in detail a portion of the lower platen of FIG. 7, with a portion of the sleeve.

The practical embodiment of the above described process is suitably carried out by means of the apparatus shown in FIGS. 1 and 7, the details of which are illustrated in the other FIGS.

Figure 2:
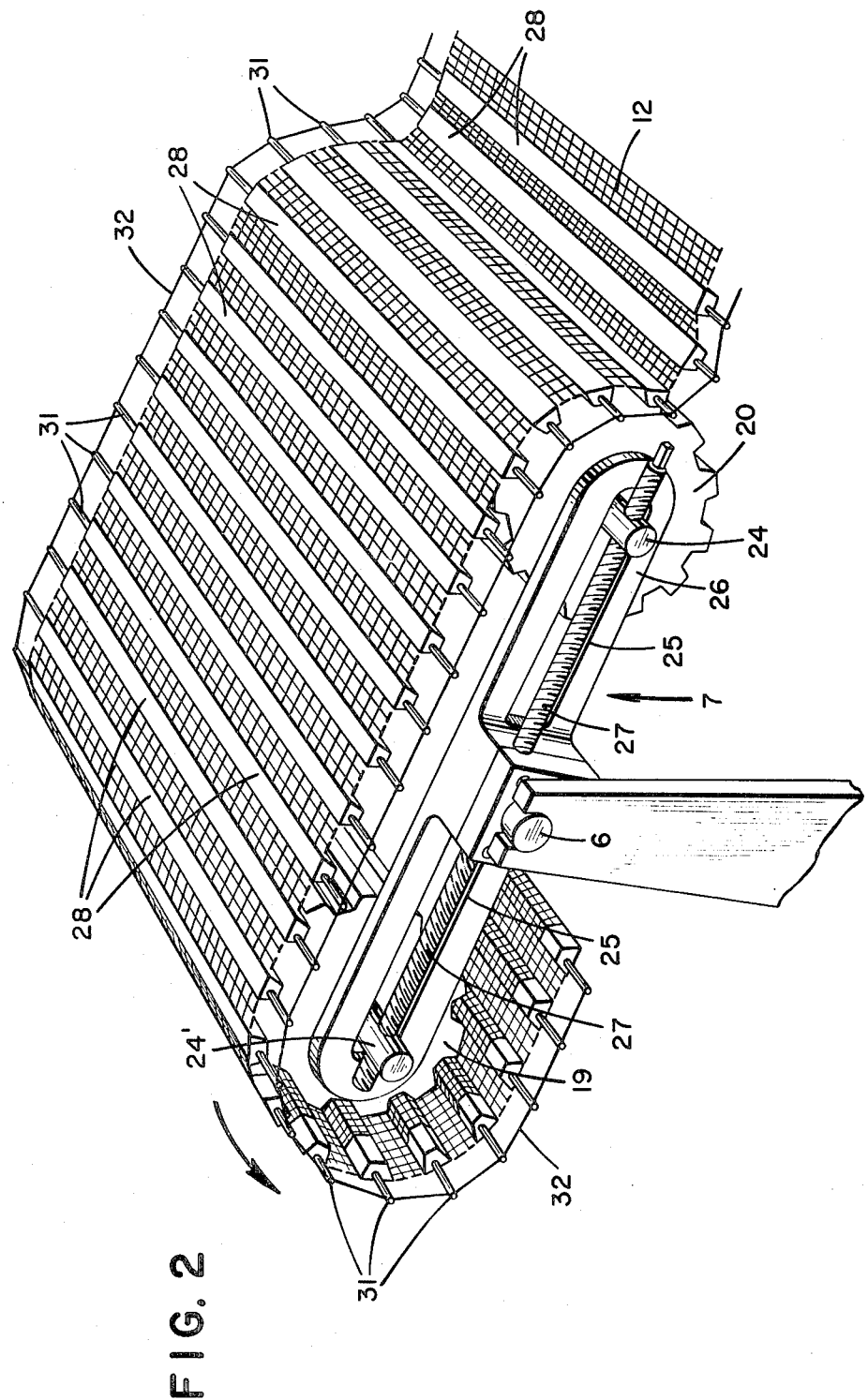
FIG. 2 represents in perspective view an element of the apparatus of FIG. 1.
Figure 3:
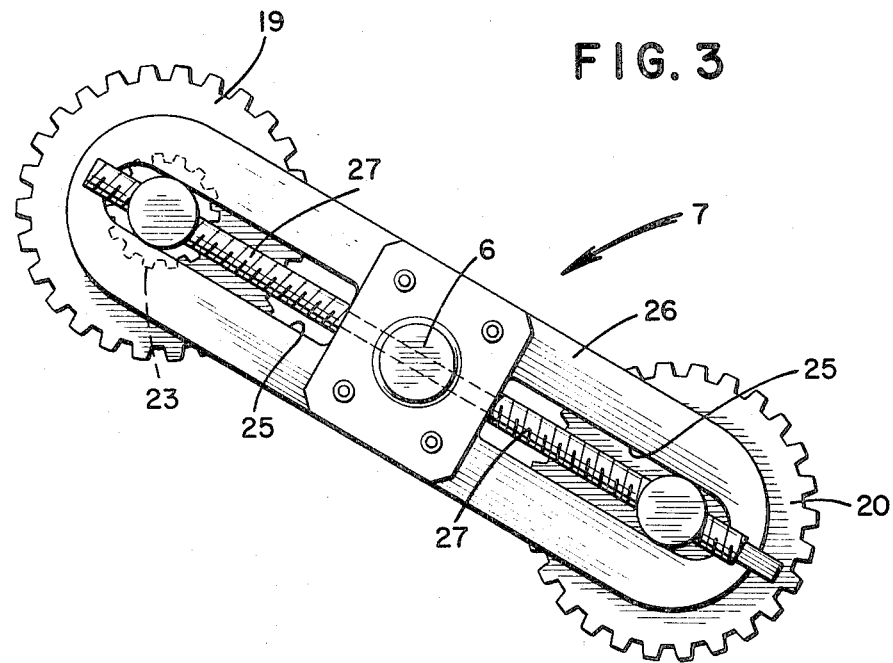

Two vertical parallel plates 2, each having an approximate U-shape are arranged on a base 1. Each plate 2 has two arms, indicated by reference numerals 3 and 4. A notch 5, provided on the end of arm 3, is intended to receive pin 6 of element 7, better represented in FIGS. 2, 3 and 4, which constitute the support on which is formed the transversally rigid annular sleeve. A bracket 8, a part of a winding device, described hereinafter, is secured on arm 4 of plate 2.

The base 1 carries moreover a support 9 for spools 10 and 11, respectively used to store a band 12 of rubberized fabric and a band 13 of elastomeric material.

The apparatus also includes a rod 14, whose functions will be described hereinafter, and an element 15, already known per se, for adjusting the tension of a cord intended to form a winding which, in the finished belt, will constitute the resistant insertion of the belt.

Rod 14 is an oscillating arm which carries a gear 16 at one end and, at the other end, is hinged to the base 1 at arms 4 of plates 2, where a motor is provided. Moreover rod 14 carries out the displacement of roller 17.

At its hinged end, rod 14 carries a gear, not visible in FIG. 1, which is actuated by a motor (not illustrated) and which, for instance by means of a chain, also not visible, imparts motion to gear 16. Moreover rod 14 is associated with a conventional mechanisum, not illustrated to initiate its oscillation about its hinged point.

Element 7, appearing in FIGS. 1 –4 is constituted by two grooved rollers 19 and 20, having parallel axes.

Roller 20, having a shaft 21, is freely rotatable about its own axis, while roller 19 carries secured on its shaft 22 a gear 23 which is able to mesh with gear 16.

The ends of shafts 21 and 22 are freely rotatable within bearings 24 and 24', respectively.

Bearings 24 and 24' are housed within windows 25 obtained in plates 26, and are slidable within windows 25. Plates 26 are two. They are situated on opposite sides of rollers 20 and 21 and act as supports for the rollers 20 and 21.

Figure 4:
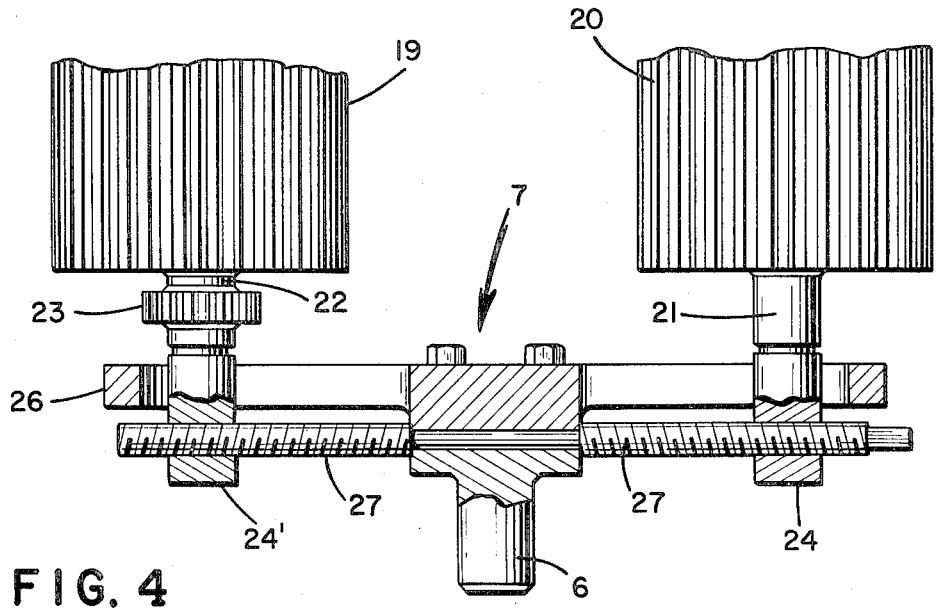
FIG. 3 and 4 represent respectively in side view and in top view some details of construction of the element of FIG. 2.

As can be seen in FIG. 4, bearings 24 and 24', housed in plate 26 are provided with threaded holes through which is passed an endless screw 27, formed in two parts one part of which is provided with right hand threads while the other part is provided with left hand threads.

By rotating screw 27, the two bearings 24 and 24' approach or separate from each other and consequently effect rollers 19 and 20 in the same way.

Moreover, at the midline of each plate 26 a pin 6 is rigidly fixed, through which element 7 is connected to plates 2 so as to be freely rotatable with respect to them.

Associated with element 7 (see FIGS. 2, 5 and 6) is a plurality of listels or bars 28, having a trapezoidal section generally of a shape complementary to the grooves of rollers 19 and 20 and of a length greater than that of said grooves of rollers 19 and 20, but equal to the width of the fabric on which they are applied. The listels or bars 28 are provided with axial holes 30 at both ends 29.

Holes 30 (see FIG. 5) have a size such as to be able to receive small bars or pins 31, connected to one another by means of a flexible element, as for instance a rope 32.

The distance between the center lines of two consecutive listels 28 is equal to the distance between the center lines of two consecutive small bars 31 on the rope 32, and said distances are equal to the pitch of the belt toothing. The listels 28 are provided, at thier terminal portions, with grooves 33 parallel to the longitudinal axis of the listel and arranged on two opposite sides, which in the section of a listel correspond to the nonparallel sides of the trapezoid.

Each listel 28 can be associated with small plates 34, having substantially a U-shape, whose arms have such a thickness so as to be elastically movable.

Said small plates 34 are provided, at the inner faces of their arms, with protuberances 35, having such a size as to be housed within the grooves 33 of the listels.

As regards the dimensions of the cross-section of the listels, they are smaller than those of the cross-sections of the grooves of the grooved rollers 19 and 20. The difference in the dimensions of the listels and of the grooves is equal to the thickness of the fabric to which the listels are applied. Moreover, as regards the height of the listels, it must be smaller than the depth of the grooves, in such a way that said listels are completely encased in the latter.

In FIG. 1, arm 4 of plate 2 carries bracket 8 of a winding device, and provision is made for adjusting the cord tension, by element 15.

The element for adjusting the cord tension is formed as follows. A cord 37, of the type generally used to constitute the resistant insertion of belts, namely a cord of a material selected from among metallic material, glass fibers or syntheic fibers, is stored on a spool 36. The spool 36 is freely rotatable about its own axis with the shaft of spool 36 being carried by a bracket 38 secured to a pillar 39 leaning on the ground.

The pillar 39 is provided with a rail 40 into which slides the support of a spool 41 freely rotatable about its own axis.

At the top pillar 39 is secured the support 42 for a roller 43, freely rotatable about its own axis.

The axes of rollers 41 and 43 are parallel to each other, are horizontal and lie in the same vertical plane.

Pillar 39 is moreover associated with small rollers 44 and 45, intended respectively to introduce and to remove the cord from the pillar, in order to convey it to the winding element carried at the end of the bracket 8.

The winding element is constituted by three small rollers 46, having coplanar and parallel axes, with which the cord 37 engages, passing between them and being partially wound up on their revolutionary surface. The bracket 8 is connected to an endless screw 47 which is controlled, by means of gears, and motor, not illustrated. By rotating screw 47, the bracket 8 moves in a direction parallel to the axis of said screw, and, with this movement initiates a similar movement of cord 37.

The apparatus according to the present invention is completed by a press having flat heated platens. The press (see FIG. 7) has two flat platens 48 and 49, having facing surfaces. The surface of platen 48 is smooth while the surface of platen 49 is provided with a plurality of grooves 50 FIG. 9), having a shape complementary to the shape of the teeth to be obtained in the belt. The grooves are spaced apart at a distance corresponding to the pitch of the belt toothing. The platens 48 and 49 of the press have a width smaller than the length of the listels associated with the rigid sleeve which they are to mold.

More particularly, the difference is equal to the length of the terminal portions of the listels, covered with the means by which the fabric is fastened to the listels themselves.

In the operation of the above described apparatus the grooved rollers 19 and 20 of element 7 are displaced with respect to each other, acting on the endless screw 27, in such a way that the axes of these rollers are at a mutual distance capable of allowing the production of a belt having the desired layout. A certain amount of rubberized band 12 is payed off from spool 10 and listels 28 are applied to it in such a manner that three sides of each listel is in contact with the rubberized fabric. The application of the listels 28 to the rubberized fabric is carried out at one of the two grooved rollers 19 or 20. The connection is effected by means of the small plates 34, whose protuberance 35 penetrate in the grooves 33 of the listels 28, the fabric 12 being interposed between said small plates and said listels. The faces of the listels which come into contact with the fabric are those of the sides and the small base of the section of the listels, which has the shape of an isoscles trapezoid. After the connection of one listel to the fabric, a small bar 31 is inserted in each hole 30 of it. This operation of applying the listels to the fabric is repeated until the portion of fabric carrying the listels has such a length as to allow the formation of a ring embracing the unit formed by the two rollers. The ring is made by overlapping the ends of the rubberized fabric and locking them to each other at at least one listel.

As stated above, the application of the listels to the fabric is effected at one of the grooved rollers 19 and 20, and, during that operation, the roller on which said application is made is rotated by hand. After having prepared a ring of fabric carrying the listels and supported by the grooved rollers 19 and 20, rod 14 is displaced from its rest position to a working position by having gear 16 mesh with gear 23.

The hydraulic device 18 is actuated so that the roller 17 is pushed against the ring of rubberized fabric to which the listels 28 are fastened at grooved roller 19, for stitching the rubberized fabric.

The motor, not illustrated, is started to impart motion to gears 16 and 23 and consequently to roller 19.

The rotation of roller 19 initiates the rotation of the ring of rubberized fabric carrying the listels, and roller 17, pressing the listels fast with the ring of rubberized fabric, imparts to the fabric a permanent deformation, namely a deformation conforming to the profile of the listels and thus to the toothing.

After the stitching operation, which is optional, rod 14 is brought again to a rest position. Element 7, carrying the two grooved rollers 19 and 20 on which is arranged the ring of fabric provided with the listels, is caused to rotate about the pin 6 after securing the end of cord 37 on the surface of the ring of fabric. The rotation of element 7 can be effected by hand or by means of a motor, not illustrated. The motor (not shown) for the rotation of endless screw 47 is started which along with the rotation of element 7 about pin 6 moves bracket 8 in a direction parallel to the axis of the endless screw 47. This movement along with the rotation of element 7 about pin 6 winds cord about the ring of fabric provided with the listels. The winding of cord constitutes in its whole a layer which will form the resistant insertion of the toothed belt.

The width of the so formed resistant layer is not sufficient to cover the whole width of the ring of fabric carrying the listels, but the edges of said fabric are left bare for a portion, corresponding for each edge to the length of the small plates 34, by means of which the fabric is locked to the listels.

After the winding is complete the motor actuating the endless screw 47 is stopped and the cord is cut immediately down-stream of winding element 46.

An adhesive agent then is applied to the winding of cord obtained on the ring of fabric provided with the listels. After the application of the adhesive rod 14 is brought again into working position, so that gear 16, meshes with the gear 23. A certain amount of band 13 of elastomeric material is payed off from spool 11, and caused to adhere, at one end, to the ring of rubberized fabric provided with the listels and covered with the winding of cord. The motor actuating gear 16 on rod 14 is started to impart motion to gear 23. The movement of gear 23 initiates the motion of the grooved roller 19 and consequently of the ring of fabric provided with the listels and with the winding of cord. The rotation of the ring of fabric initiates the winding of the ring itself with the band 13 of elastomeric material. The number of revolutions of the ring of fabric is so selected that a layer 13' of elastomeric material is formed, having the required thickness.

The width of the band 13 of elastomeric material is smaller than the width of the fabric, and is equal to the width of the resistant layer or cord layer.

As a result of the above described operations, a transversally rigid sleeve for belts is obtained.

The grooved rollers 19 and 20 are now moved toward each other by actuating endless screw 27 and the transversally rigid sleeve is removed from element 7 and conveyed to the press. Said transversally rigid sleeve is inserted about the lower platen 49 of the press, and its listels 28 are arranged within the grooves 50 of said platen.

Since the listels 28 have a length greater than the width of the platen 49, the ends of said listels remain outside the platen and therefore outside the grooves 50 of the latter. The means connecting the fabric to the listels are removed, and then the listels are unthreaded from the grooves. The operation for removing the listels from the grooves of the press platens is simple, since the small plates 34 which lock the fabric to the listles are outside the grooves of the platen itself.

Immediately after this latter operation, the press platens are approached and pressed the one against the other. Under the action of the pressure exerted by the platens and of the heat transmitted by them, the portion of rigid sleeve arranged between the press platens is molded and simultaneously cured, so as to form a belt portion.

Figure 9:
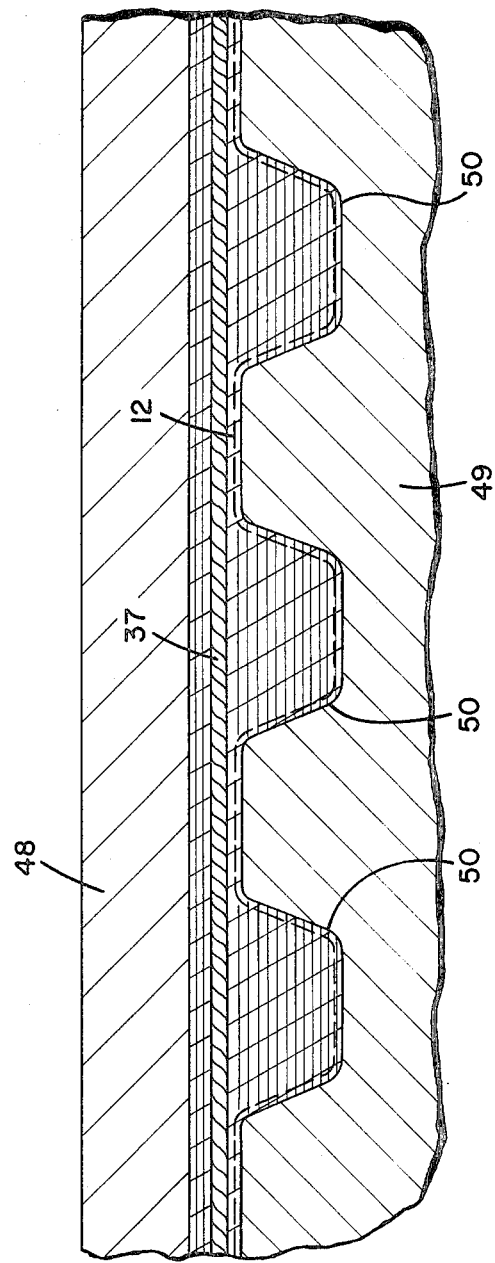
FIG. 9 illustrates in detail a portion of the platens of FIG. 7 and a portion of the belt after molding.

When this operation is over, the position of the platens is that represented in FIG. 9, which shows, between the press platens, a portion of toothed belt after molding and curing.

After curing, the press platens are opened, the cured portion is removed from them, and an adjacent portion of sleeve is introduced between said platens in such a way that some teeth of the already molded and cured belt portion are positioned in the grooves 50 of the platen 49 of the press.

Obviously, the teeth of the already molded and curbed belt portion which are arranged in the grooves of the platen are those which are disposed at one end of the portion. These teeth are placed at the end grooves of the platens.

This procedure is continued until the whole sleeve has been molded and cured.

The so formed toothed belt shows a continuous strip of fabric, projecting in cantilever fashion from its sides; said strip is trimmed.

From the above description it can be understood how it is possible to achieve the indicated advantages. In fact, the layout of the belts to be produced can have any value, because the same apparatus is always employed, by simply varying the relative distance between the two grooved rollers.

It follows that the apparatus according to the present invention does not involve, in consequence of its increased over-all size, necessary to obtain belts having a large layout, a corresponding increase in weight. The weight of the apparatus remains always constant.

Moreover, by means of the process and of the apparatus according to the present invention, the weight of the material to be transported for the curing operation is only that of the rigid sleeve to be cured. Since this weight is not remarkable, the production cost can be kept low.

The details of contruction of the invention can of course be varied as necessary, it being understood that the present invention includes any other alternative embodiment deriving from the above indicated inventive concept. In particular it includes the alternative embodiment according to which, for supporting the sleeve during its preparation, at least one of the two rollers is smooth.

What is claimed is:

1. A process for manufacturing toothed belts of elastomeric material, comprising applying transversally on a band of rubberized fabric a plurality of listels spaced apart at regular intervals from one another, causing said rubberized fabric to contact a part of the outer surface of said listels; closing the fabric provided with the listels in the form of a ring on a support; applying a winding of cords on the ring of fabric, provided with listels, while it is supported; forming a layer of elastomeric material on the winding of cords, originating in this way transversally rigid annular sleeve; removing the transversally rigid sleeve from the support; positioning a given portion of said annular sleeve in a mold cavity; removing the listels from said given portion of the transversally rigid sleeve; molding the elastomeric material of the sleeve portion into the mold cavity to fill said cavity including the space, from which the listels have been removed while simultaneously curing the sleeve portion, and repeating the removal of the listels and molding while curing until the whole sleeve has been treated.

2. The process of claim 1 including stitching said ring of fabric provided with listels after the step of closing the fabric provided with the listels in the form of a ring.

* * * * *

UNITED STATES PATENT OFFICE
CERTIFICATE OF CORRECTION

Patent No. 3,856,907    Dated December 24, 1974

Inventor(s) MARIO CICOGNANI

It is certified that error appears in the above-identified patent and that said Letters Patent are hereby corrected as shown below:

Item [75], change "Marion" to --- Mario ---;

Col. 1, line 31, cancel "is a curing drum and";
Col. 2, line 46, change "seriation" to --- seriatim ---;
Col. 4, line 10, change "mechanisum" to --- mechanism ---;
Col. 4, line 53, change "thier" to --- their ---;
Col. 5, line 13, change "syntheic" to --- synthetic ---;
Col. 5, line 44, open a bracket before "Fig. 9";
Col. 5, line 68, change "protuberance" to --- protuberances ---;
Col. 6, line 5, change "isoscles" to --- isosceles ---;
Col. 7, line 49, change "curbed " to --- cured ---; and
Col. 8, line 40, insert --- a --- between "way" and "transversally".

Signed and sealed this 8th day of April 1975.

(SEAL)
Attest:

RUTH C. MASON
Attesting Officer

C. MARSHALL DANN
Commissioner of Patents
and Trademarks